United States Patent
Martin

(10) Patent No.: US 10,657,421 B2
(45) Date of Patent: May 19, 2020

(54) SHAPE DETECTION

(71) Applicant: MorphoTrust USA, LLC

(72) Inventor: Brian K. Martin, McMurray, PA (US)

(73) Assignee: Morpho Trust USA, LLC, Billerica, MA (US)

( * ) Notice: Subject to any disclaimer, the term of this patent is extended or adjusted under 35 U.S.C. 154(b) by 0 days.

(21) Appl. No.: 16/220,135

(22) Filed: Dec. 14, 2018

(65) Prior Publication Data

US 2019/0220706 A1   Jul. 18, 2019

Related U.S. Application Data

(63) Continuation of application No. 15/604,424, filed on May 24, 2017, now Pat. No. 10,176,403.

(60) Provisional application No. 62/340,915, filed on May 24, 2016.

(51) Int. Cl.
| | |
|---|---|
| *G06K 9/62* | (2006.01) |
| *G06K 9/00* | (2006.01) |
| *G06K 9/46* | (2006.01) |
| *G06K 9/36* | (2006.01) |

(52) U.S. Cl.
CPC ....... *G06K 9/6267* (2013.01); *G06K 9/00463* (2013.01); *G06K 9/4604* (2013.01); *G06K 2009/363* (2013.01)

(58) Field of Classification Search
CPC .. G06T 7/12; G06T 7/143; G06T 7/55; G06T 17/05; G06K 9/00201
See application file for complete search history.

(56) References Cited

U.S. PATENT DOCUMENTS

| | | | |
|---|---|---|---|
| 7,056,322 B2* | 6/2006 | Davison | A61B 17/1725 606/98 |
| 7,075,551 B2* | 7/2006 | Becker | G06T 11/001 345/589 |
| 7,139,979 B2* | 11/2006 | Schultz | G09G 5/00 715/763 |
| 7,149,356 B2 | 12/2006 | Clark et al. | |
| 7,239,929 B2 | 7/2007 | Ulrich | |
| (Continued) | | | |

OTHER PUBLICATIONS

International Search Report and Written Opinion in International Application No. PCT/US2017, dated Aug. 7, 2017, 13 pages.
(Continued)

*Primary Examiner* — Yosef Kassa
(74) *Attorney, Agent, or Firm* — Fish & Richardson P.C.

(57) ABSTRACT

Methods, systems, and apparatus, including computer programs encoded on a computer storage medium, for shape detection are disclosed. In one aspect, a method includes the actions of generating a shape model that includes a predetermined shape with a predetermined scale and predetermined orientation. The actions further include receiving an image. The actions further include identifying edges that are parallel to the side of the shape model and that are a predetermined distance from the side of the shape model. The actions further include selecting a plurality of edges that likely correspond to edges of a shape that is similar to the shape model. The actions further include determining a fit score between the plurality of edges and each shape of a plurality of shapes that are similar to the shape model. The actions further include identifying a particular shape in the image that most closely fits the shape model.

21 Claims, 6 Drawing Sheets

(56) References Cited

U.S. PATENT DOCUMENTS

| | | | |
|---|---|---|---|
| 7,720,276 B1 | 5/2010 | Korobkin | |
| 8,145,925 B2* | 3/2012 | Oh | G06F 1/3203 |
| | | | 713/320 |
| 8,154,616 B2* | 4/2012 | Icho | G01B 11/03 |
| | | | 348/211.1 |
| 8,326,021 B2 | 12/2012 | Kobayashi | |
| 8,379,014 B2 | 2/2013 | Wiedemann | |
| 8,411,086 B2* | 4/2013 | Rieffel | G06T 17/00 |
| | | | 345/419 |
| 9,092,695 B1 | 7/2015 | Ogale | |
| 9,098,905 B2* | 8/2015 | Rivlin | G06T 7/246 |
| 10,176,403 B2 | 1/2019 | Martin | |
| 2013/0287265 A1 | 10/2013 | Nepomniachtchi et al. | |

OTHER PUBLICATIONS

Wikipedia.com [online]. "Generalised Hough transform," Last modified Apr. 4, 2015, [retrieved on Sep. 20, 2017]. Retrieved from the Internet: URL<https://en.wikipedia.org/wiki/Generalised_Hough_transform>.

Wikipedia.com [online]. "Hough transform," Last modified Mar. 30, 2015, [retrieved on Sep. 20, 2017]. Retrieved from the Internet: URL<https://en.wikipedia.org/wiki/Hough_transform>.

Wikipedia.com [online]. "Random sample consensus," Last modified Sep. 6, 216, [retrieved on Sep. 21, 2017]. Retrieved from the Internet: URL<https://en.wikipedia.org/wiki/RANSAC>.

European Extended Search Report in European Application No. 17803540, dated May 13, 2019, 9 pages.

Grigorescu et al., "Distance sets for shape filters and shape recognition." IEEE transactions on image processing, Oct. 1, 2003, 12(10):1274-86.

Kamat et al., "An Efficient Implementation of the Hough Transform for Detecting Vehicle License Plates Using DSP's," Proceedings Real-Time Technology and Applications Symposium, May 15, 1995, pp. 58-59.

Skoryukina et al., "Automatic Number Plate Recognition System," Proceedings of the 7th International Conference on Computer Science and Information Technologies 2009, pp. 347-350.

Skoryukina et al., "Real time rectangular document detection on mobile devices." Seventh International Conference on Machine Vision, International Society for Optics and Photonics, Feb. 14, 2015, 9445:94452A, 6 pages.

* cited by examiner

SHAPE DETECTION

CROSS REFERENCE TO RELATED APPLICATION

This application is a continuation of U.S. patent application Ser. No. 15/604,424 filed May 24, 2017, which claims the benefit of U.S. Application No. 62/340,915, filed on May 24, 2016, which is incorporated by reference.

FIELD

This specification relates to detecting shapes in an image.

BACKGROUND

Shape, or object, recognition is a computer vision technique for finding and identifying objects in an image or video sequence. Humans recognize a multitude of objects in images with little effort, despite the fact that the image of the objects may vary somewhat in different viewpoints, in many different sizes and scales or even when they are translated or rotated. Humans can even recognize objects that are partially obstructed from view. This task is still a challenge for computer vision systems.

SUMMARY

The subject matter described in this application relates to detecting and registering an expected geometric shape in a digital image. In some implementations, detecting and registering an expected geometric shape may include the generalized Hough transformation. This implementation is based on populating histogram of parameters describing the shape. Each possible parameter has a bin and each pixel in the image is examined to see if it contributes to each of the bins. This suffers from both slow performance when there are many pixels or many parameters to define the shape. It also suffers from the discrete nature of using bins, which can make it miss the solution.

Furthermore, the approach may not very tolerant to distortions of the shape. In particular, a system should detect a projection of a 2D shape captured in three dimensional space. Introduction of pose and perspective change decrease the performance of the Hough approach. In some implementations, the approaches do not take a 'hint' or expected solution to guide the shape detection.

The shape detection system described below quickly identifies shapes even in the presence of noise in the image. The system may tolerate perspective distortion of the shape and could start with an initial guess at the shape location to help speed processing.

The shape detection system includes a feature to capture an image from a camera (e.g., on a mobile phone) of a driver's license, detect the borders of the card, and register the outline of the card. The next action is an image warp to remove perspective and camera distortions to normalize the image for authenticating the document and/or running optical character recognition on the card.

The method for detecting two dimensional geometric shapes from an image includes the following actions. A first action is that a predefined shape is constructed to the expected average scale and orientation of the desired shape we aim to detect. This is the shape model. A second action is that a digital image is acquired. A third action is that edges parallel to the shape model are calculated within a predefined distance perpendicular to the shape at intervals along the shape boundaries. A fourth action is that the strongest edges at each interval are stored for examination. A fifth action is that the shape candidate and all expected variations in the shape are fit against the stored edge points, the most likely fit is determined and returned as the shape candidate. In some implementations, in shapes with straight edges (e.g., rectangle), each line segment can be fit independently using the first four actions and then fit a line using the fifth action and fit steps A-D, then fit a line in E using random sample consensus (RANSAC). The final shape may be constructed from a combination of all line segments.

According to an innovative aspect of the subject matter described in this application, a method for shape recognition includes the actions of generating a shape model that includes a predetermined shape with a predetermined scale and predetermined orientation; receiving an image; identifying, in the image for each side of the shape model, edges that are parallel to the side of the shape model and that are a predetermined distance from the side of the shape model; selecting, from among the identified edges, a plurality of edges that likely correspond to edges of a shape that is similar to the shape model; determining a fit score between the plurality of edges and each shape of a plurality of shapes that are similar to the shape model; and identifying, from among the plurality of shapes, a particular shape in the image that most closely fits the shape model.

These and other implementations can each optionally include one or more of the following features. The shape model and the particular shape have a same number of edges. The predetermined distance from the side of the shape model is a predetermined number of pixels. The action of identifying a particular shape in the image that most closely fits the shape model includes identifying the particular shape with a highest fit score. The action of identifying, in the image for each side of the shape model, edges that are parallel to the side of the shape model and that are a predetermined distance from the side of the shape model comprises identifying the edges at predetermined pixel intervals. The shape model has straight edges. The action of selecting, from among the identified edges, a plurality of edges that likely correspond to edges of a shape that is similar to the shape model includes selecting the plurality of edges have a largest gradient among the identified edges.

Other implementations of this aspect include corresponding systems, apparatus, and computer programs recorded on computer storage devices, each configured to perform the operations of the methods.

The subject matter described in this application may have one or more of the following advantages. A system may preform shape recognition faster than previous methods. The system may user less computing power and save battery power in performing shape recognition because the system does not perform edge detection on the entire image.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
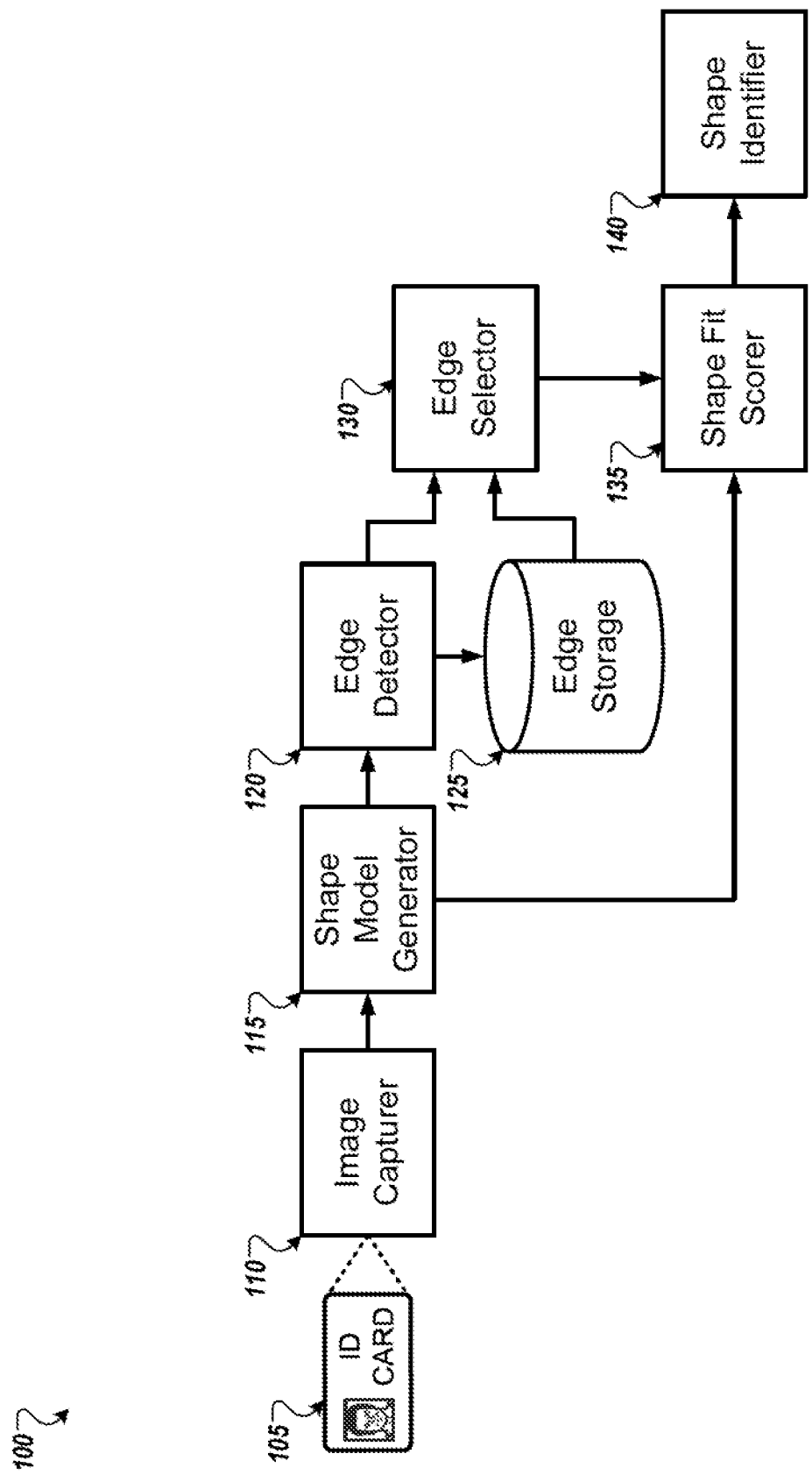
FIG. 1 illustrates an example system for detecting shapes in an image.

FIG. 1 illustrates an example system 100 for detecting shapes in an image. Briefly, and as described in more detail below, the system 100 processes an image and identifies shapes included in the image. The system 100 generates a guess for the image. The system 100 identifies edges that are near the sides of the guess for the image, and identifies a best fit for a shape in the image.

In more detail and as shown in the example of FIG. 1, the system captures an image of the document 105 using an image capturer 110. The document 105 may be any type of document such as a driver's license, a passport, a contract, a photograph, or any other similar document. The document 105 may not even be a document. For example, the document 105 may be replaced by a brick or any object that has straight sides.

The image capturer 110 may be any type of device that is capable of capturing an image. For example, the image capturer 110 may be a camera, a mobile phone with a camera, a webcam, scanner, or any other similar type of image capturing device. As an example, a user may attempt to take a picture of a driver's license with a camera of a mobile phone.

The image capture 110 provides the captured image to the shape model generator 115. The shape model generator 115 generates a guess for the shape, or object, that the system 100 is attempting to identify. In some implementation, for the system 100 to identify the shape of the document 105, the system 100 has to generate guess of the shape that has a same number of sides as the object that the system is attempting to identify. For example, the system 100 is attempting to identify a driver's license that has four sides. The shape model generator 115 should generate a guess of the shape of the driver's license that has four sides.

The shape model generator 115 provides the guess of the shape to the edge detector 120. In some implementations, the image capturer 110 provides the image directly to the edge detector 120. In this instance, the shape model generator 115 does not provide the image to the edge detector 120.

The edge detector 120 is configured to detect edges that are parallel to the sides of the guess of the shape and that are within a particular distance of the sides of the guess. For example, the edge detector may only identify edges that are parallel to the sides of the image and that are within fifty pixels of the sides of the guess of the shape.

The edge detector 120 identifies by calculating gradients between pixels. The edge detector 120 may calculate a vertical gradient by calculating the difference between pixels that are on the left and right of each other. The edge detector 120 may calculate a horizontal gradient by calculating the difference between pixels that are above and below of each other. The edge detector 120 may identify edges in groups of pixels to by calculating gradients involving pixels that are diagonal from each other.

In some implementations, an edge detector processes an image to identify edges by processing the whole image. Instead, the edge detector 120 only evaluates the image within a certain pixel width of the sides of the guess of the shape. In some implementations, the edge detector 120 identifies edges at certain pixel intervals around the sides of the guess of the shape. For example, the edge detector 120 may only attempt to identify edges at every tenth pixel around the sides of the guess of the shape. By only detecting edges at particular intervals, the edge detector 120 may operate faster and use less processing power than other edge detectors.

Figure 4:
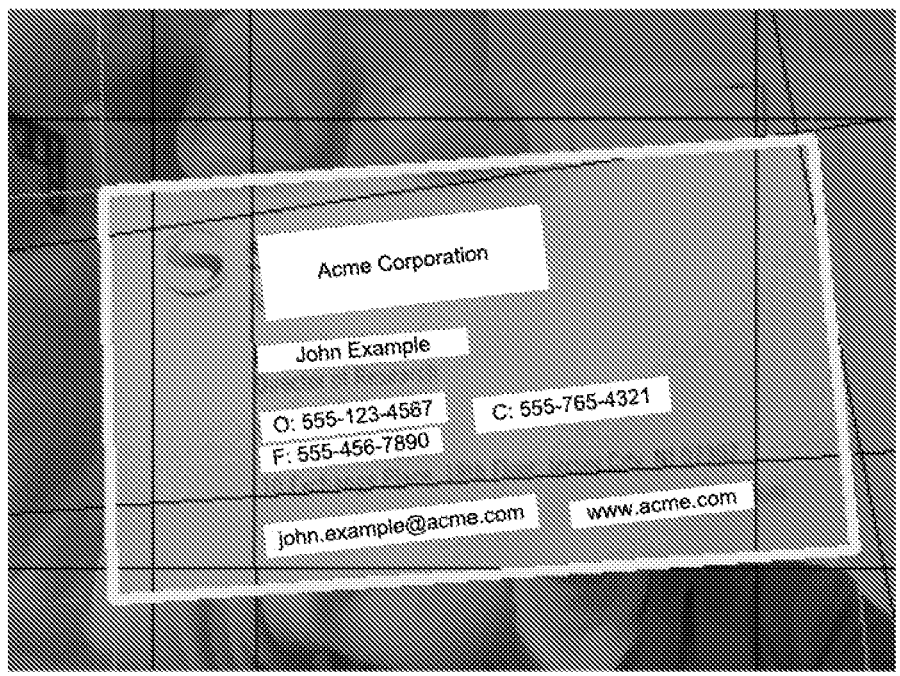
FIG. 4 illustrates, in the top image, an example video capture of a business card with example line candidates that are the thin lines, and, in the bottom image, an example diagnostic output of the edges detected and used for locating the business card.
Figure 4:
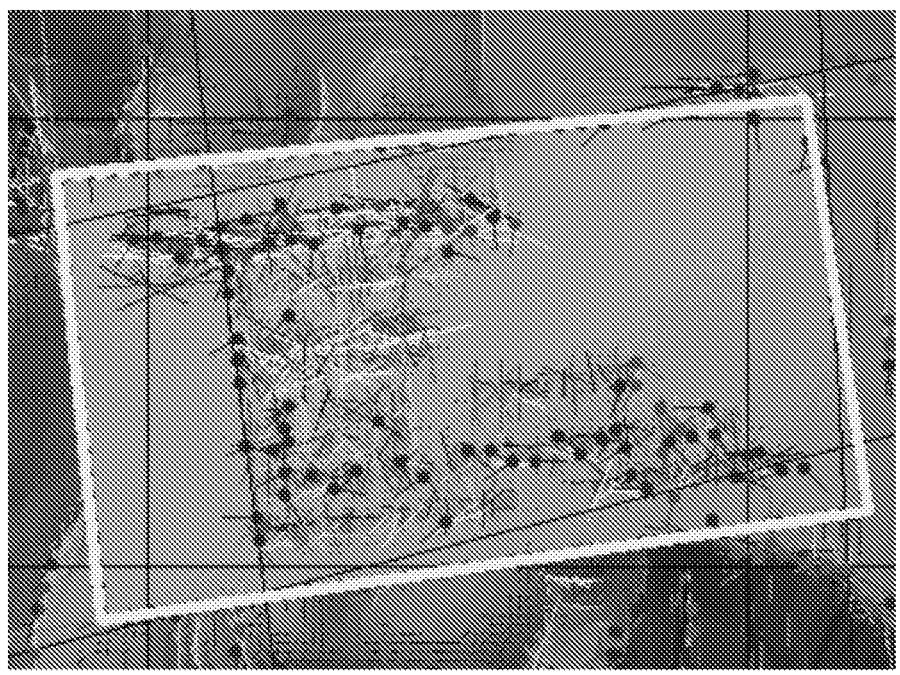
Figure 5:
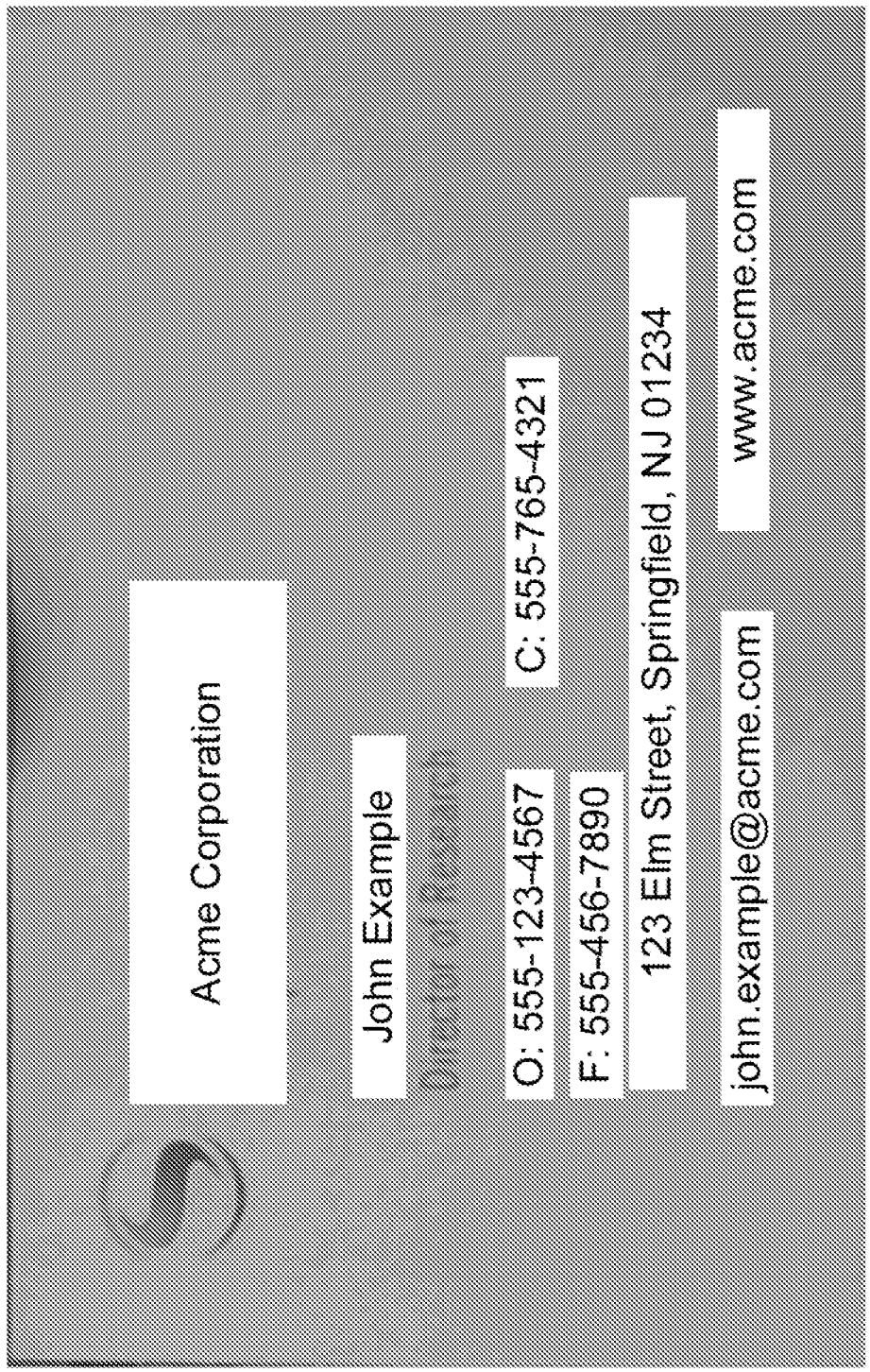
FIG. 5 illustrates an example output rectangle with linear skew correction applied to make a standard shape business card (or driver's license card).

There may be edges present in the image that are not detected by the edge detector 120. For example, the image of FIG. 4 includes edges for the index finger. The index finger forms edges between the side of the finger and the background of the wall. However, the edge detector 120 does not identify the edges on the sides of the index finger that are perpendicular to the top of the guess of the shape. The edge detector 120 does identify the edges formed between the middle and ring fingers as those are likely within a threshold distance (e.g., fifty pixels) of the left side of the guess of the shape.

The edge detector 120 stores the edges in the edge storage 125. The edge storage 125 may include storage for the location of each edge, the gradient of the edge, the direction of each edge, and any other relevant information.

The edge selector 130 selects the strongest edges from the edge storage. In some implementations, the edge detector 120 does not provide edge information directly to the edge selector 130. Instead, the edge detector 120 stores edges in the edge storage 125 and the edge selector 130 analyzes the edges stored in the edge storage 125. The strongest edges may be the edges with the largest gradient.

In some implementations, the edge selector 130 selects the strongest quarter of the edges in the edge storage 125. In some implementations, the edge selector selects the two hundred strongest edges. In some implementations, the edge detector 120 may not detect edges at particular intervals near the sides of the guess of the shape. In this case, the edge detector 120 may detect all edges that are within a threshold distance of the sides of the guess of the shape and that are parallel to the sides of the guess of the shape. The edge selector 130 may select the strongest edges at particular intervals. For example, the edge selector 130 may select the strongest edges every tenth pixel.

The shape fit scorer 135 identifies shapes that are the shapes of best fit to the edges selected by the edge selector 130. The shape fit scorer 135 may calculate a score that indicates how well the shape of best fit matches the edges selected by the edge selector 130.

The edge selector 130 may identify additional edges at different intervals, or the same intervals at different offsets. For example, the edge selector 130 may identify the strongest edges at every eighth pixel. The edge selector 130 may select additional edges at every tenth pixel, but pixel intervals may be in the middle of those previous edges at every tenth pixel. In other words, the edge selector 130 may select additional edges at every tenth pixel and then at every tenth pixel offset by five pixels.

In some implementations, the shape fit scorer 135 tries to fit the guess of the shape as generated by the shape model generator 115 to the selected edges. The shape fit scorer 135 may also calculate fit scores for any expected variations of the guess of the shape.

The shape fit scorer 135 may calculate scores for additional shapes of best fit for the additional groups of edges selected by the edge selector 130. The shape fit scorer 135 may provide the shapes of best fit for each of the groups of selected edges to the shape identifier 140. In some implementations, the shape fit scorer 135 may provide the shape of best fit and additional top ranking shapes (e.g., shape of second best fit) for each group of selected edges to the shape identifier 140. As noted above, the shape fit scorer 135 may fit each line segment independently.

The shape fit scorer 135 may provide the candidate shapes and correspond shape fit scores to the shape identifier 140. The shape identifier 140 may select the shape with the highest fit score and return that shape as the shape for the document 105. In some implementations, the shape fit scorer 135 may receive line segments from the shape fit scorer 135. The shape identifier 140 may construct a shape for the document 105 using the line segments received from the shape fit scorer 135.

Figure 2:
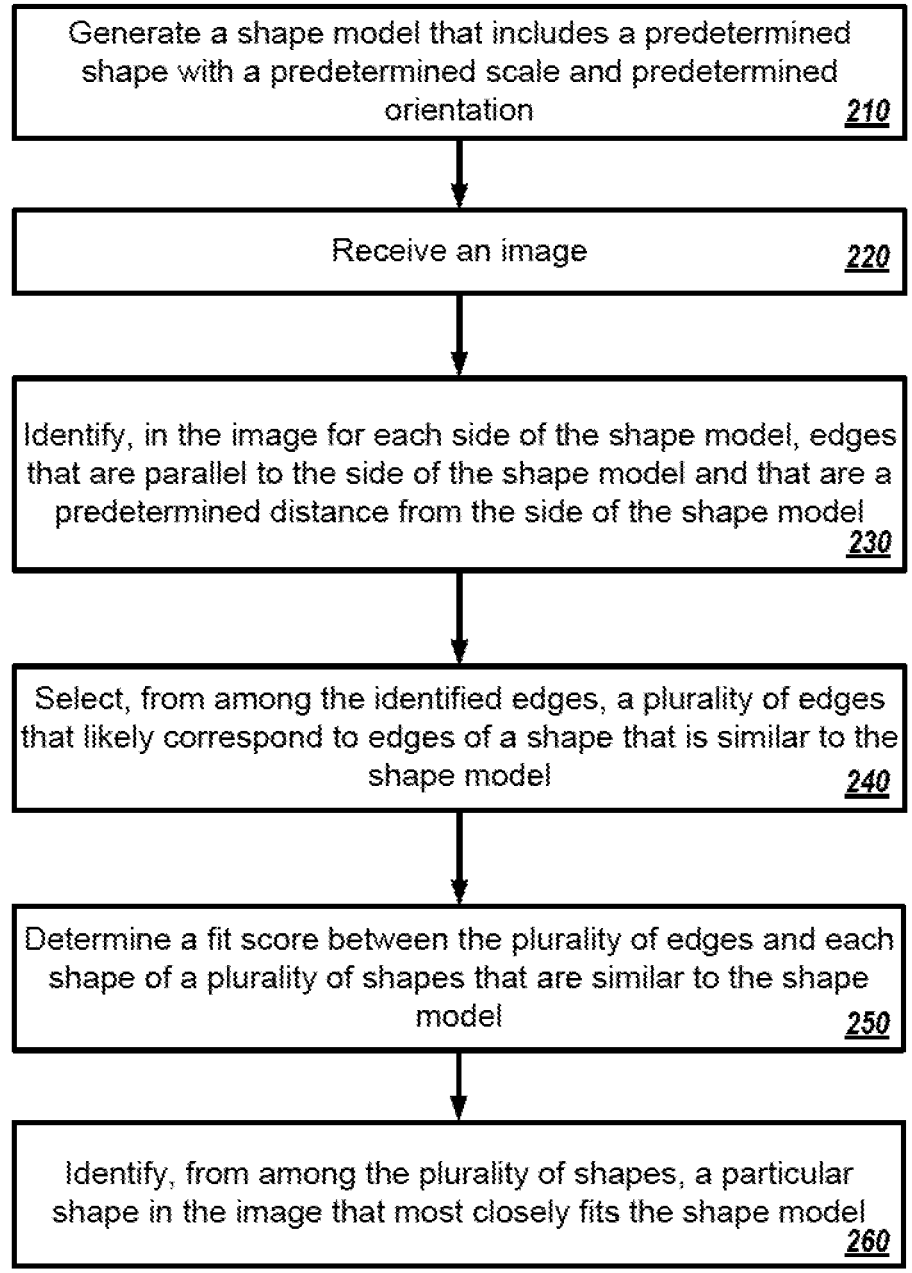
FIG. 2 illustrates an example process detecting shapes in an image.
Figure 3:
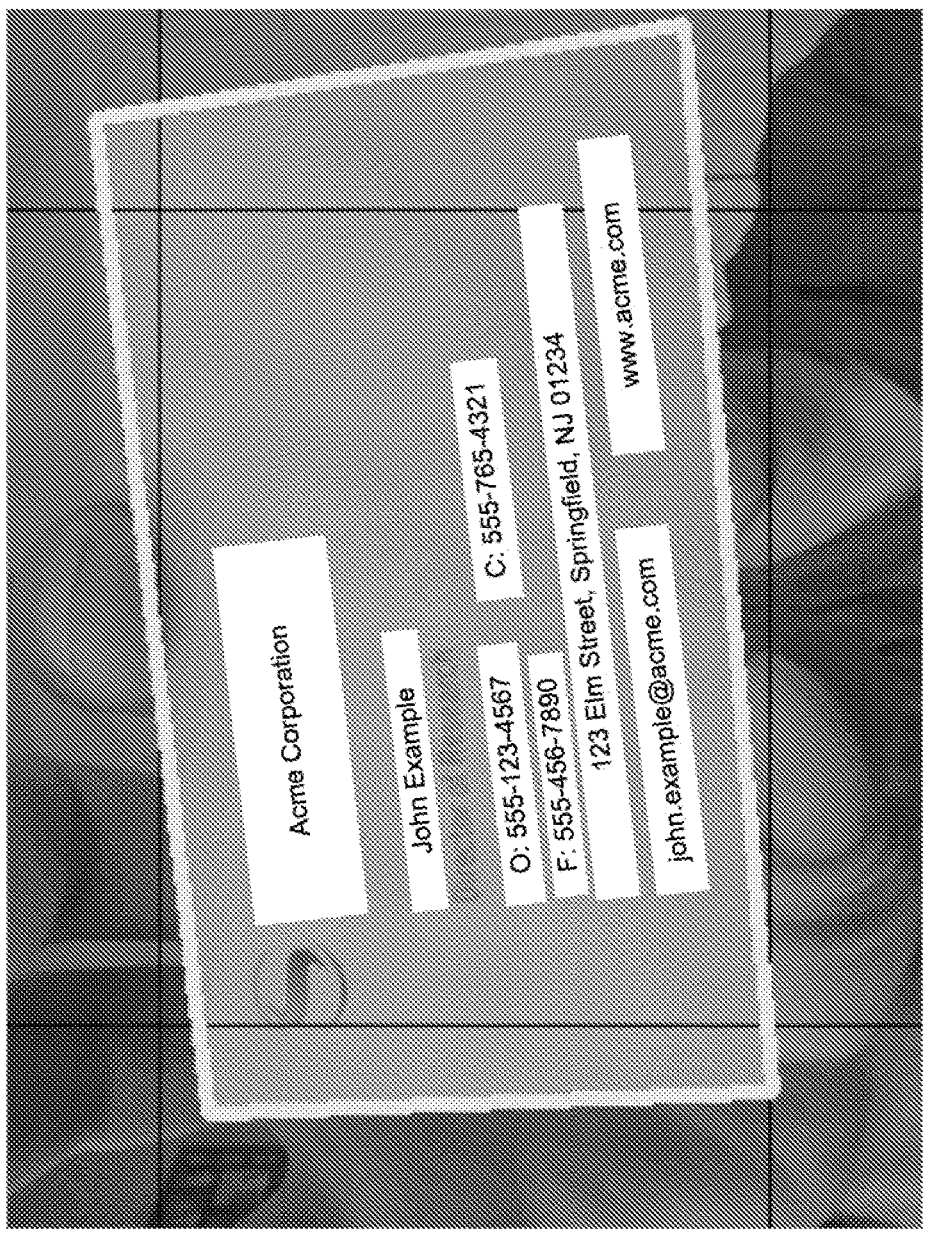
FIG. 3 illustrates an example video capture from a laptop computer of a business card with thin lines to illustrate a recommended capture area and bold lines that highlight the detected business card.

FIG. 2 illustrates an example process 200 for detecting shapes in an image. In general, the process 200 identifies edges in an image that are within a predetermined distance from an initial guess of the shape. The process 200 identifies a best fit shape for the edges. The process 200 designates the best fit shape as a likely corresponding to the primary shape in the image. The process 200 will be described as being performed by a computer system comprising one or more computers, for example, the system 100 as shown in FIG. 1.

The system generates a shape model that includes a predetermined shape with a predetermined scale and predetermined orientation (210). In some implementations, the shape model has straight edges. In some implementations, the shape model and the object that the system is attempting to identify have the same number of edges. For example, if the system is attempting to identify the shape of a driver's license, then the system will have to start with a shape model with four edges.

The system receives an image (220). The system may receive the image by capturing the image with a camera or receive the image from a different computing device.

The system identifies, in the image for each side of the shape model, edges that are parallel to the side of the shape model and that are a predetermined distance from the side of the shape model (230). In some implementations, the predetermined distance from the side of the shape model is a predetermined number of pixels. For example, the predetermined distance may be fifty pixels. In some implementations, the system identified the edges at predetermined intervals. For example, the system may identify the edges every twelve pixels.

The system selects, from among the identified edges, a plurality of edges that likely correspond to edges of a shape that is similar to the shape model (240). In some implementations, the system selects the edges that have the largest gradient among the identified edges. For example, the system may select the top twenty percent of edges with the highest gradient. In some implementations, the system may select the edges with the highest gradient at select intervals. For example, the system may select the edges with the highest gradient every five pixels.

The system determines a fit score between the plurality of edges and each shape of a plurality of shapes that are similar to the shape model (250). The fit score may reflect a quality of a fit between the plurality of edges selected by the system and the shapes that are similar to the shape model. The system may determine fit scores for several shapes that are similar to the shape model.

The system identifies, from among the plurality of shapes, a particular shape in the image that most closely fits the shape model (260). In some implementations, the system identifies the shape in the image as shape that most closely fits the shape model by selecting the shape with the highest fit score.

In more detail, the method is designed to take real time video input and detect driver's license cards in the field of view. The detected licenses are segmented from the image and returned in at in a standard rectangular format at the requested resolution along with quality metrics to determine the suitability for further processing.

The method may be customized for grayscale landscape frame buffers with height of three-hundred pixels. Any other format image will be converted to grayscale and resampled to minimum image dimension of three-hundred pixels. Any size input video frame can be used, but it should be able to support the desired resolution of the output. If it cannot meet the desired output resolution, the output will be up-sampled and the resolution quality metric will show a low score.

The method may expect a card to be presented into the middle of the video image with approximately one sixth of the area being the background border. This can be seen in FIG. 1 that illustrates a sample video capture (e.g., from laptop computer and of business card). The lines that are perpendicular to the edges of the figure show the recommended capture area with one sixth border and the bold border (e.g., marginal quality) highlights of the detected card.

Each video frame that is captured is down sampled, converted to grayscale, and edges in the vicinity of the one sixth boarder are detected to find line candidates. The two edge candidates, that likely correspond to the most accurate edges, for each of the four boarders are used to construct rectangle candidates. These rectangle candidates are scored on their shape to pick the most likely card candidate (e.g., large cards with aspect ratio 3.370 to 2.125).

In some implementations, since the method is edge based, when the card has other high contrast edges in the print or when the card is against a background of similar color, the may perform additional processing to find the correct line candidates to construct the rectangle. If an accurate set of lines or if an accurate rectangle cannot be detected, the capture process will continue to the next video frame.

The likeliest rectangle candidate (e.g., a convex quadrilateral at this point) is chosen and then mapped to a rectangle (e.g., 3.370×2.125) and re-rendered at the requested resolution to that shape. The rectangle fit may be only coarsely aligned to the card as illustrated in FIG. 2B. In some implementations, the actions include fine tuning the alignment of the rectangle at higher resolutions.

The actions include analyzing the rectangular sample for quality. The metrics calculated include: Focus, Exposure, Color Saturation, and Resolution. In some implementations, these are returned on a 0-100 scale (e.g., 100 indicating a highest score). These quality scores along with the rectangle confidence score are used as an overall capture score.

After one capture is complete, the software can display the detected rectangle on the video feed and color code the rectangle to reflect the capture score (e.g., red=poor, yellow=marginal, green=good).

The capture method continues and captures another frame, detects the rectangle and scores the result. If the new capture is likely better than the old capture, the new result is kept. If it is likely worse, then the method continues to capture. If a likely good capture is detected after a particular amount of time (e.g., three seconds), the capture is complete. If a likely good capture is not detected after the particular amount of time (e.g., three seconds), the previous likely best result is erased and another capture attempt is started. After a specified number of capture attempts (e.g., nine seconds worth) the method determine that the capture has not completed successfully.

In some implementations, if a likely good capture is detected in the first particular amount of time (e.g. three seconds), it may be beneficial to store that result but take another attempt (e.g., a three second attempt) to determine if the result is better. After acquiring a likely good quality image, the rectangular output can be used for further processing such as fine tuning alignment, optical character recognition, driver's license state detection, color (white balance) correction, illumination correction, etc. In some implementations, a device, such as a laptop computer executes the method at a rate of ten millisecond per frame and may run at near real time on a mobile device.

Figure 6:
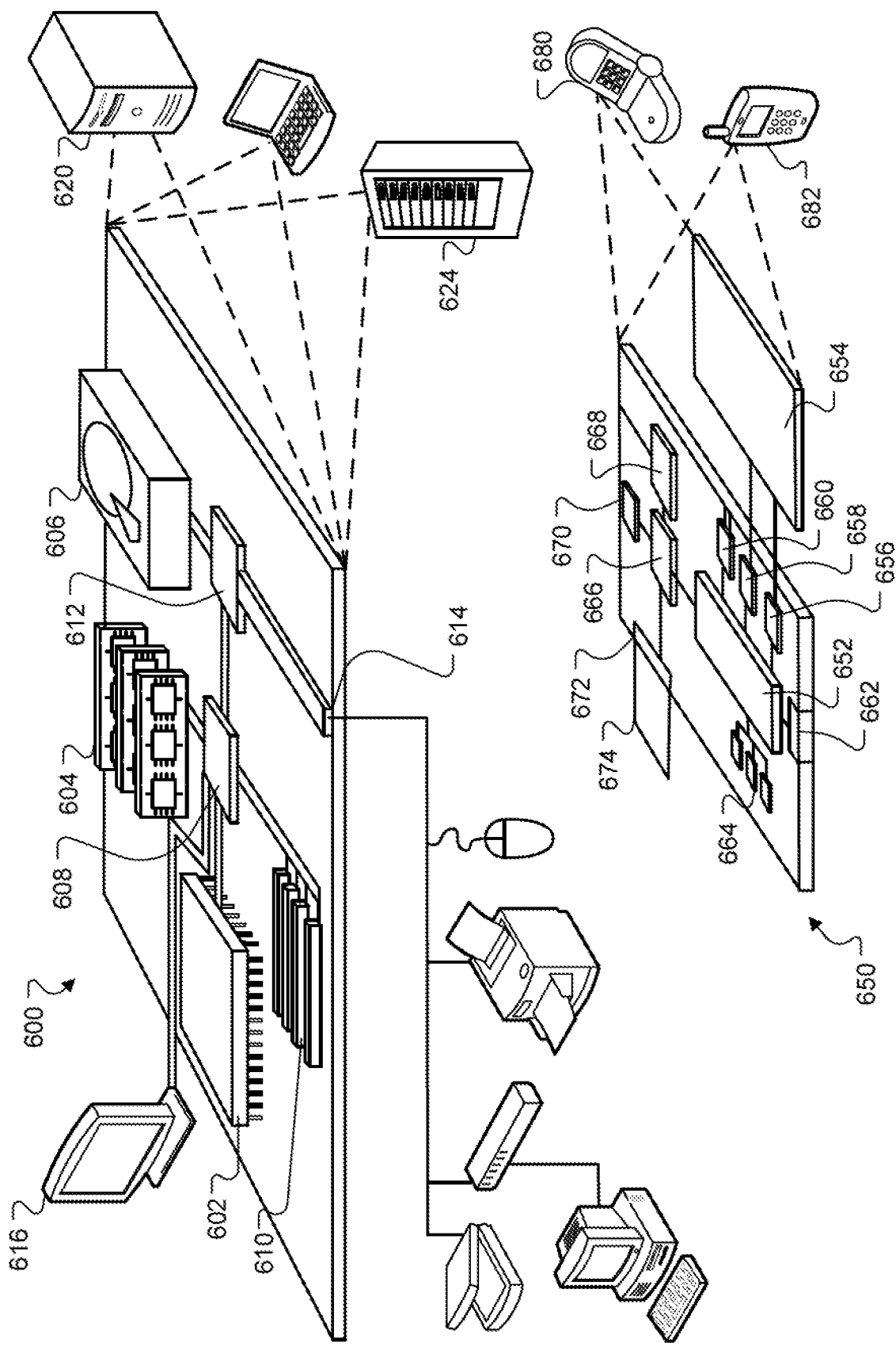
FIG. 6 illustrates an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver. In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
   receiving, by a computing device, an image;
   generating, by the computing device, a shape of an object to detect in the image;
   identifying, by the computing device and in the image, edges that are parallel to a side of the shape and that are within a threshold distance of the side of the shape;
   determining, by the computing device, a contrast of each edge;
   based on the contrast of each edge, selecting, by the computing device and from among the edges, a plurality of edges;
   determining, by the computing device, a plurality of candidate objects that are defined by the plurality of edges;
   comparing, by the computing device, each candidate object of the plurality of objects to the shape of the object to detect in the image; and
   based on comparing each candidate object of the plurality of objects to the shape of the object to detect in the image, selecting, by the computing device, a candidate object as the object to detect in the image.

2. The method of claim 1, wherein the object and the selected object have a same number of sides.

3. The method of claim 1, wherein the threshold distance from the side of the shape is a predetermined number of pixels.

4. The method of claim 1, wherein selecting the candidate object as the object to detect in the image comprises determining that the candidate object most closely fits the shape of the object.

5. The method of claim 1, wherein identifying edges that are parallel to a side of the shape and that are within a threshold distance of the side of the shape comprises identifying the edges at predetermined pixel intervals.

6. The method of claim 1, wherein the shape of the object to detect in the image has straight edges.

7. The method of claim 1, wherein selecting the plurality of edges comprises selecting the plurality of edges that have a largest gradient among the edges.

8. A system comprising:
   one or more computers; and
   one or more storage devices storing instructions that are operable, when executed by the one or more computers, to cause the one or more computers to perform operations comprising:
   receiving, by a computing device, an image;
   generating, by the computing device, a shape of an object to detect in the image;
   identifying, by the computing device and in the image, edges that are parallel to a side of the shape and that are within a threshold distance of the side of the shape;
   determining, by the computing device, a contrast of each edge;
   based on the contrast of each edge, selecting, by the computing device and from among the edges, a plurality of edges;
   determining, by the computing device, a plurality of candidate objects that are defined by the plurality of edges;
   comparing, by the computing device, each candidate object of the plurality of objects to the shape of the object to detect in the image; and
   based on comparing each candidate object of the plurality of objects to the shape of the object to detect in the image, selecting, by the computing device, a candidate object as the object to detect in the image.

9. The system of claim 8, wherein the object and the selected object have a same number of sides.

10. The system of claim 8, wherein the threshold distance from the side of the shape is a predetermined number of pixels.

11. The system of claim 8, wherein selecting the candidate object as the object to detect in the image comprises determining that the candidate object most closely fits the shape of the object.

12. The system of claim 8, wherein identifying edges that are parallel to a side of the shape and that are within a threshold distance of the side of the shape comprises identifying the edges at predetermined pixel intervals.

13. The system of claim 8, wherein the shape of the object to detect in the image has straight edges.

14. The system of claim 8, wherein selecting the plurality of edges comprises selecting the plurality of edges that have a largest gradient among the edges.

15. A non-transitory computer-readable medium storing software comprising instructions executable by one or more computers which, upon such execution, cause the one or more computers to perform operations comprising:
   receiving, by a computing device, an image;
   generating, by the computing device, a shape of an object to detect in the image;
   identifying, by the computing device and in the image, edges that are parallel to a side of the shape and that are within a threshold distance of the side of the shape;
   determining, by the computing device, a contrast of each edge;
   based on the contrast of each edge, selecting, by the computing device and from among the edges, a plurality of edges;
   determining, by the computing device, a plurality of candidate objects that are defined by the plurality of edges;
   comparing, by the computing device, each candidate object of the plurality of objects to the shape of the object to detect in the image; and
   based on comparing each candidate object of the plurality of objects to the shape of the object to detect in the image, selecting, by the computing device, a candidate object as the object to detect in the image.

16. The medium of claim 15, wherein the object and the selected object have a same number of sides.

17. The medium of claim 15, wherein the threshold distance from the side of the shape is a predetermined number of pixels.

18. The medium of claim 15, wherein selecting the candidate object as the object to detect in the image comprises determining that the candidate object most closely fits the shape of the object.

19. The medium of claim 15, wherein identifying edges that are parallel to a side of the shape and that are within a threshold distance of the side of the shape comprises identifying the edges at predetermined pixel intervals.

20. The medium of claim 15, wherein the shape of the object to detect in the image has straight edges.

21. The system of claim 15, wherein selecting the plurality of edges comprises selecting the plurality of edges that have a largest gradient among the edges.

* * * * *